United States Patent
Brown et al.

(10) Patent No.: US 8,918,648 B2
(45) Date of Patent: Dec. 23, 2014

(54) DIGITAL SIGNATURE AND KEY AGREEMENT SCHEMES

(75) Inventors: Daniel Richard L. Brown, Mississauga (CA); Marinus Struik, Mississauga (CA)

(73) Assignee: Certicom Corp., Mississauga (CA)

(*) Notice: Subject to any disclaimer, the term of this patent is extended or adjusted under 35 U.S.C. 154(b) by 705 days.

(21) Appl. No.: 12/712,937

(22) Filed: Feb. 25, 2010

(65) Prior Publication Data

US 2011/0208970 A1    Aug. 25, 2011

(51) Int. Cl.
| | | |
|---|---|---|
| *H04L 9/32* | (2006.01) | |
| *H04L 9/08* | (2006.01) | |
| *H04L 9/00* | (2006.01) | |
| *H04L 9/30* | (2006.01) | |
| H04L 29/06 | (2006.01) | |

(52) U.S. Cl.
CPC ............. *H04L 9/3066* (2013.01); *H04L 9/0883* (2013.01); *H04L 9/3281* (2013.01); *H04L 63/08* (2013.01); *H04L 9/08* (2013.01); *H04L 9/30* (2013.01); *H04L 63/0428* (2013.01); *H04L 63/061* (2013.01); *H04L 9/0844* (2013.01); *H04L 9/3252* (2013.01)
USPC ........... 713/176; 713/168; 713/171; 380/278; 380/282; 380/44

(58) Field of Classification Search
CPC ....... H04L 63/08; H04L 63/0428; H04L 9/08; H04L 63/061; H04L 9/0844; H04L 9/3281; H04L 9/0883; H04L 9/30
USPC ............. 713/176, 168, 171; 380/278, 282, 44
See application file for complete search history.

(56) References Cited

U.S. PATENT DOCUMENTS

| 7,249,259 B1 | 7/2007 | Vanstone et al. | |
|---|---|---|---|
| 2002/0025038 A1* | 2/2002 | Lambert et al. | 380/44 |
| 2007/0081667 A1* | 4/2007 | Hwang | 380/30 |
| 2009/0063863 A1* | 3/2009 | Durand et al. | 713/171 |

FOREIGN PATENT DOCUMENTS

| EP | 1063813 a2 | 12/2000 |
|---|---|---|
| WO | WO2008058377 A1 | 5/2008 |
| WO | WO2009030021 A1 | 3/2009 |

OTHER PUBLICATIONS

Menezes, A. et al.; Handbook of Applied Cryptography; 1997; pp. 517, 528 to 529; CRC Press, Boca Raton, Florida.
Hankerson, D. et al; Guide to Elliptic Curve Cryptography; 2004; p. 184 to 185, 195 to 196; Springer-Verlag, New York.
Hankerson, D. et al; Guide to Elliptic Curve Cryptography; 2004; Chapter 4; Cryptographic Protocols ED; pp. 153 to 204; Springer-Verlag, New York.
Antipa A. et al.; "Validation of Elliptic Curve Public Keys"; Jan. 6, 2003; Lecture Notes in Computer Science; pp. 211 to 223; vol. 2567; Springer-Verlag, Germany.

(Continued)

*Primary Examiner* — Aravind Moorthy
(74) *Attorney, Agent, or Firm* — Shahrzad Esmaili; Blake, Cassels & Graydon LLP

(57) ABSTRACT

A method is disclosed for performing key agreement to establish a shared key between correspondents and for generating a digital signature. The method comprises performing one of key agreement or signature generation, and using information generated in said one of key agreement or signature generation in the other of said key agreement or said signature generation. By doing this, computations and/or bandwidth can be saved.

31 Claims, 9 Drawing Sheets

(56) References Cited

OTHER PUBLICATIONS

"Ephemeral key"; Internet citation from Wikipedia; Nov. 6, 2009; http://en.wikipedia.org/wiki/Ephemeral_key.

Manet, Pascal; Search Report from corresponding European Application No. 10154733.9; search completed Jul. 14, 2010.

Pascal, Manet; European Search Report issued Nov. 8, 2012 from corresponding EP Application No. 10154733.9; search completed Oct. 31, 2012.

* cited by examiner

DIGITAL SIGNATURE AND KEY AGREEMENT SCHEMES

TECHNICAL FIELD

The following relates generally to digital signature schemes and key agreement schemes in the field of cryptography.

BACKGROUND

A cryptographic system is a computer system that uses cryptography, typically to secure or authenticate data communication between a pair of computing devices connected to one another through a data communication link in the system. Each computing device has a cryptographic unit with the processing capacity to implement one or more cryptographic protocols used to secure or authenticate the data communication. The cryptographic protocols typically perform arithmetic operations on the bit strings representing parameters, messages, or data in the protocols to produce a bit string representing the output from the protocol.

Cryptographic systems can be broadly divided into two categories: systems that employ symmetric-key schemes, and systems that employ asymmetric or public key schemes. In symmetric-key schemes, the correspondents first agree upon a key that is both secret and authentic. Each correspondent then uses this shared secret key to perform operations such as encryption, decryption, and/or data integrity and data origin authentication.

Symmetric-key schemes have relatively high efficiency; however, they suffer from the key distribution problem, that is, the problem of securely distributing the secret key to each entity. A further drawback of symmetric-key schemes is that such schemes generally cannot use digital signatures to provide non-repudiation services. Since the symmetric key is shared among two or more correspondents, when one correspondent uses the key to sign a message, the signature will not be unique because another correspondent possessing the shared secret key could also generate the same signature. In a symmetric-key scheme, with at least two correspondents, A and B, correspondent B would never be able to prove that correspondent A signed a message, and not he. Accordingly, a third party C could not be convinced that B did not sign the message, especially if it was in any way in B's interest to have done so. This is because B shares the symmetric key with A, and therefore B can do anything with the key that A can do. In particular, A can repudiate such signatures, with the claim that B signed, and B would not be able to refute A's assertion.

Public key schemes, on the other hand, eliminate the above-described problem by allowing the use of elegant digital signature schemes that provide non-repudiation services. Public key schemes also eliminate the key distribution problem. In a public key scheme, each correspondent utilizes a private key and a public key related to the private key by a mathematical function. The mathematical function presents a "difficult" mathematical problem to ensure that a private key of a correspondent cannot be obtained from the corresponding public key. An example of one such problem is the discrete logarithm problem over a finite field, which is used as the basis for public key systems that can implement signature algorithms such as the digital signature algorithm (DSA) and key agreement schemes such as the Diffie-Hellman scheme or the Menezes-Qu-Vanstone (MQV) scheme. A particularly robust and efficient system makes use of points on an elliptic curve defined over a finite field. Such systems, referred to as elliptic curve cryptographic (ECC) systems, offer high levels of security at faster computation time than other systems.

The reason public key schemes allow for elegant digital signature algorithms that provide non-repudiation services is because each correspondent has a unique private key that only he knows, and therefore each correspondent can use his private key to generate a unique signature that binds himself to a message. A third party can then use the correspondent's corresponding public key to verify that the signed message did indeed originate from that correspondent. An example of such a signature scheme used in an elliptic curve cryptographic system is referred to as the Elliptic Curve Digital Signature Algorithm (ECDSA).

Public key schemes also avoid the key distribution problem because secret keys are not shared between correspondents and so no distribution of shared secret keys is necessary.

Therefore, public key schemes are advantageous because of the above-discussed properties. However, the drawback of public key schemes is that they are generally not as efficient at performing encryption or decryption operations, or at performing some data integrity operations. Therefore, many current cryptographic systems combine and exploit the strengths of both symmetric key schemes and public key schemes. An example of such a system is one that utilizes key agreement. Correspondent A possesses long-term or static private/public key pair $(a, Q_A)$ and correspondent B possesses static private/public key pair $(b, Q_B)$. These static private and public keys are then used in generating a shared symmetric key k to use for each communication session. A and B each calculate the shared key k based on public static and public ephemeral keys it receives from the other party, as well as based on private static and private ephemeral keys it generates itself.

Key agreement schemes are well known in the art. An example of a well-known key agreement scheme is the Menezes-Qu-Vanstone (MQV) scheme, which adapted for an elliptic curve cryptographic systems is known as Elliptic Curve Menezes-Qu-Vanstone (ECMQV) key agreement. Key agreement schemes such as ECMQV are a useful way of distributing (i.e. sharing) secret keys.

In some situations, key agreement participants may require non-repudiation services or vice versa. However, the number of operations required to perform both key agreement and digital signatures can prove to be costly in certain computationally constrained environments. Also, transmitting a signature across a communication channel requires bandwidth, as the signature components must be transmitted to the recipient to allow for verification.

BRIEF DESCRIPTION

Representative embodiments will be described by way of example only with reference to the accompanying drawings, in which.

DETAILED DESCRIPTION

Figure 1:
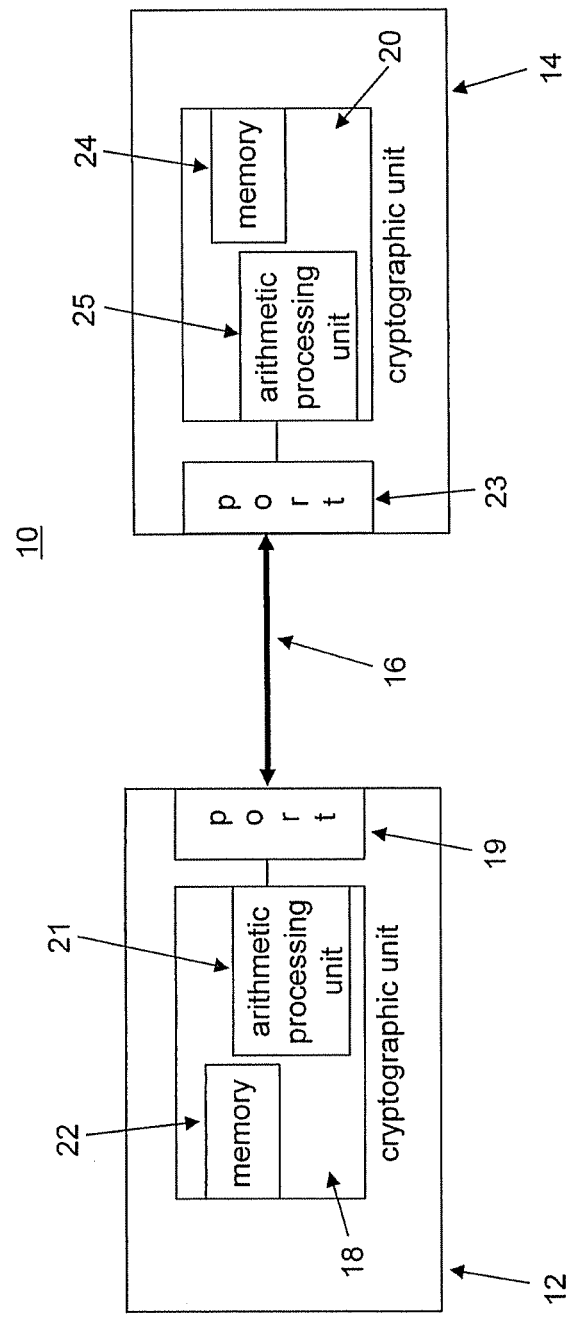
FIG. 1 is a schematic representation of a data communication system.

In general terms, the following provides methods for utilizing parameters generated in one of a key agreement scheme and a digital signature scheme to reduce the number of computations and/or reduce the bandwidth requirements in the other scheme.

A system configured to perform the methods is also provided, as well as a computer-readable medium having stored thereon computer readable instructions for performing the methods.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that that any module, component, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Figure 2:
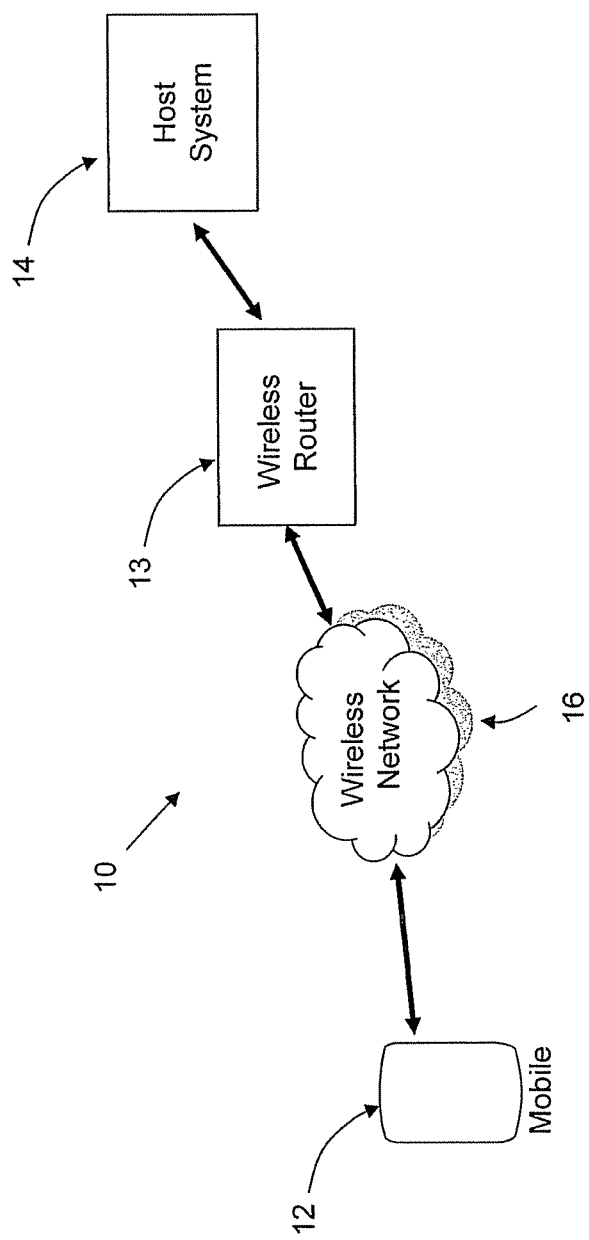
FIG. 2 is a schematic of one specific example of the communication system of FIG. 1.

Turning first to FIG. 1, a data communication system is generally denoted by numeral 10. The system 10 includes a first correspondent 12 and a second correspondent 14, which are typically a pair of computing devices, such as a client/server, a pair of computers, or a pair of mobile devices, who communicate with each other over a communication channel 16. FIG. 2 shows one specific implementation of the data communication system 10 of FIG. 1 in which the correspondent 12 is a mobile device, the correspondent 14 is a corporate enterprise computer system (host system), and the communication channel 16 is a wireless network. In the embodiment shown in FIG. 2, the host system 14 provides a host service that offers push-based messages for the mobile device 12. The host service is also capable of notifying and presenting data to the user in real-time at the mobile device 12 when data arrives at the host system 14. The wireless router 13 provides the wireless connectivity functionality as it acts to both abstract most of the wireless network's complexities, and it also implements features necessary to support pushing data to the mobile device 12. Although not shown, a plurality of mobile devices may access data from the host system 14.

The embodiment shown in FIG. 2 is one specific implementation. More generally, and returning to FIG. 1, correspondents 12 and 14 are a pair of computing devices that each include a cryptographic unit 18 and 20 respectively to implement cryptographic protocols and associated arithmetic operations. Specifically, each cryptographic unit 18 and 20 has an arithmetic processing unit 21 and 25 for performing cryptographic operations operating on an elliptic curve E defined over a chosen field. Parameters of the elliptic curve, as well as other values, are stored in memory 22 and 24 respectively. Each correspondent 12 and 14 has a communication port 19 and 23 for communicating over channel 16.

Figure 3:
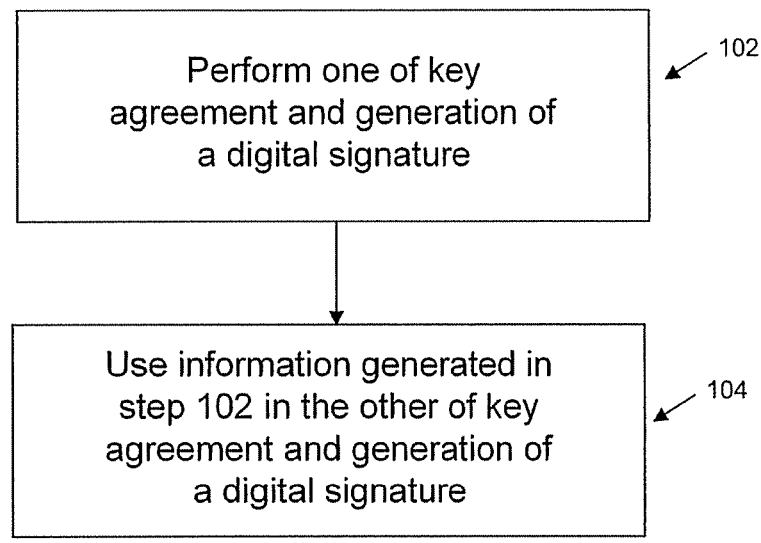
FIG. 3 is a schematic representation of an embodiment of a method of performing key agreement and generating a digital signature.

Turning next to FIG. 3, there is shown a method for performing key agreement to establish a shared key between correspondents 12 and 14, and for generating a digital signature for a message in the data communication system 10. The method generally comprises the following two steps. In step 102, the cryptographic unit 18 of correspondent 12 performs one of key agreement and generation of a digital signature. During said one of key agreement and generation of the digital signature, correspondent 12 generates both private information and information obtainable by correspondent 14.

In step 104, the cryptographic unit 18 of correspondent 12 subsequently uses the private information and the information obtainable by correspondent 14 to perform the other of key agreement and generation of the digital signature.

Specific embodiments will now be described in the context of particular key agreement and digital signature schemes.

Figure 4:
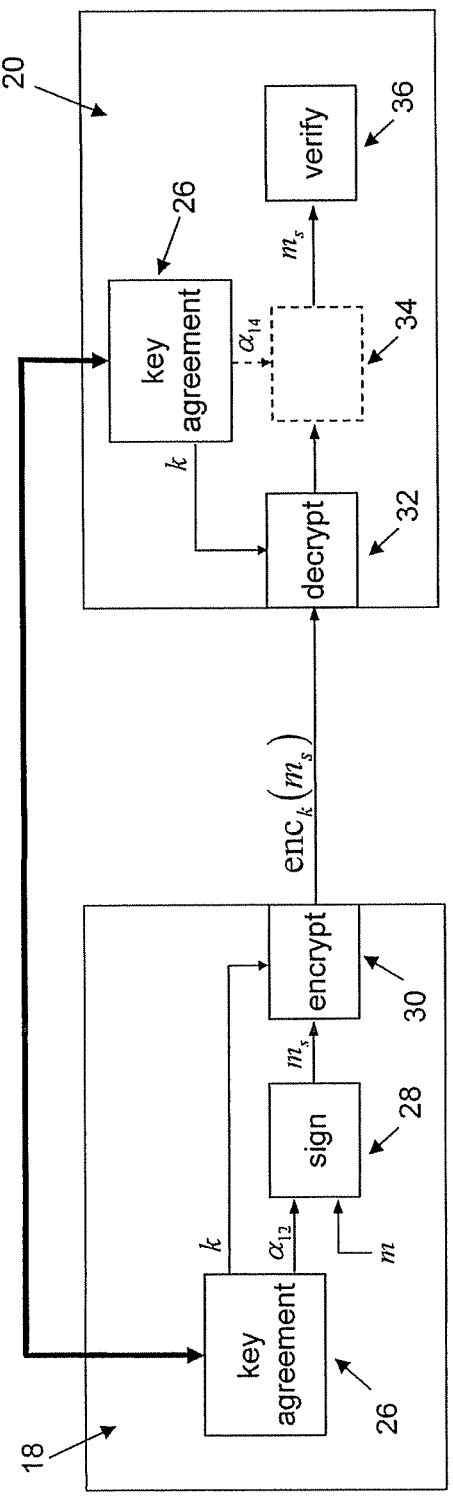
FIG. 4 is a schematic overview of an embodiment of an improved digital signature scheme.

In a first embodiment, an overview of a signature scheme implemented by correspondent 12 and correspondent 14 is shown in FIG. 4. Each correspondent first performs a key agreement scheme 26 to establish a shared secret session key k. During key agreement 26, correspondent 12 generates and stores ephemeral information $\alpha_{12}$. This information $\alpha_{12}$ traditionally has not been retained once key agreement is complete. $\alpha_{12}$ may include, for example, the ephemeral private and public keys generated during key agreement, or an intermediary shared secret value calculated during key agreement. The ephemeral information $\alpha_{12}$ generated by correspondent 12 during key agreement 26 is stored in memory 22 for subsequent use in a signing algorithm 28.

During the session, a message m that is to be signed is acted upon by a signing algorithm 28 that uses information $\alpha_{12}$ generated during key agreement. As will be clear in the specific embodiments described below, the use of $\alpha_{12}$ reduces the computational complexity of signing algorithm 28. The signed message $m_s$ is then encrypted 30 using the session key k and sent to correspondent 14.

The message $m_s$ is decrypted 32 by correspondent 14, and the signature is verified 36. Optionally, to save bandwidth, correspondent 12 can instead send only a portion of signed message $m_s$. If this is the case, correspondent 14 uses ephemeral information $\alpha_{14}$ it generated during key agreement 26 to obtain the additional signature components (box 34, shown in dashed lines). Such an arrangement reduces the bandwidth required to send the signature components, but requires additional computations by correspondent 14.

Turning now to specific implementations of the embodiment shown in FIG. 4, methods are described in which the ephemeral public and/or ephemeral private keys generated during a key agreement scheme for establishing a shared key K are used either directly or indirectly to replace the ephemeral public key in a subsequent digital signature scheme. These methods will be described in terms of modifications to the ECDSA based on ephemeral keys generated in ECMQV. ECDSA and ECMQV are known in art and are discussed in detail, for example, in "Guide to Elliptic Curve Cryptography," Vanstone et al., Springer, 2004, pp. 184 and 195 respectfully, the contents of which are incorporated by reference. It will be appreciated that other digital signature schemes that employ an ephemeral public key can instead be used, and that other key agreement schemes in which participating entities calculate ephemeral private and ephemeral public keys can instead be used.

In a first described embodiment, the ephemeral private and public keys computed by correspondent 12 during a key agreement scheme are used directly as the ephemeral private and public keys in the signature generation portion of a digital signature scheme. Considering an embodiment that implements ECDSA and ECMQV, this means that an ephemeral public key X that correspondent 12 generates in ECMQV is subsequently used as the ephemeral public key in ECDSA. As will be apparent below, this results in computational savings over traditional ECDSA and also saves in bandwidth because the portion r of the signature (r, s) need not be transmitted across the channel.

Figure 5:
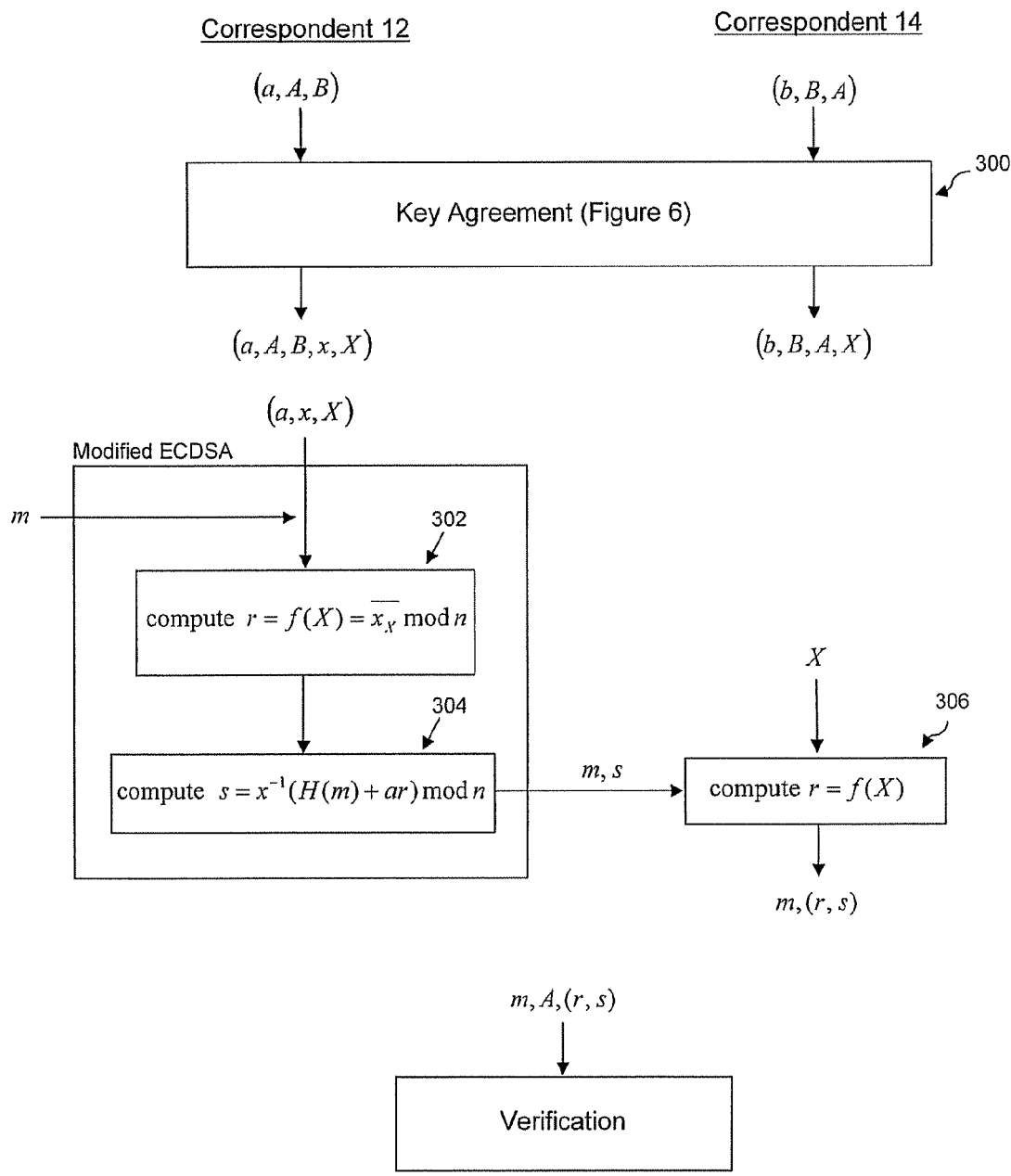
FIG. 5 is a schematic representation of one implementation of the improved digital signature scheme.

Turning therefore to FIG. 5, it will be assumed that correspondent 12 has static private/public key pair (a, A) and that correspondent 14 has static private/public key pair (b, B). Therefore, initially (prior to key agreement) correspondent 12 has stored in its memory 22 keys a, A, and B, whereas correspondent 14 has stored in its memory 24 keys b, B, and A. It will be appreciated that each correspondent could have different static key pairs for the key agreement and signature operations; however, for simplicity, it will be assumed that each correspondent has only one static private/public key pair.

Figure 6:
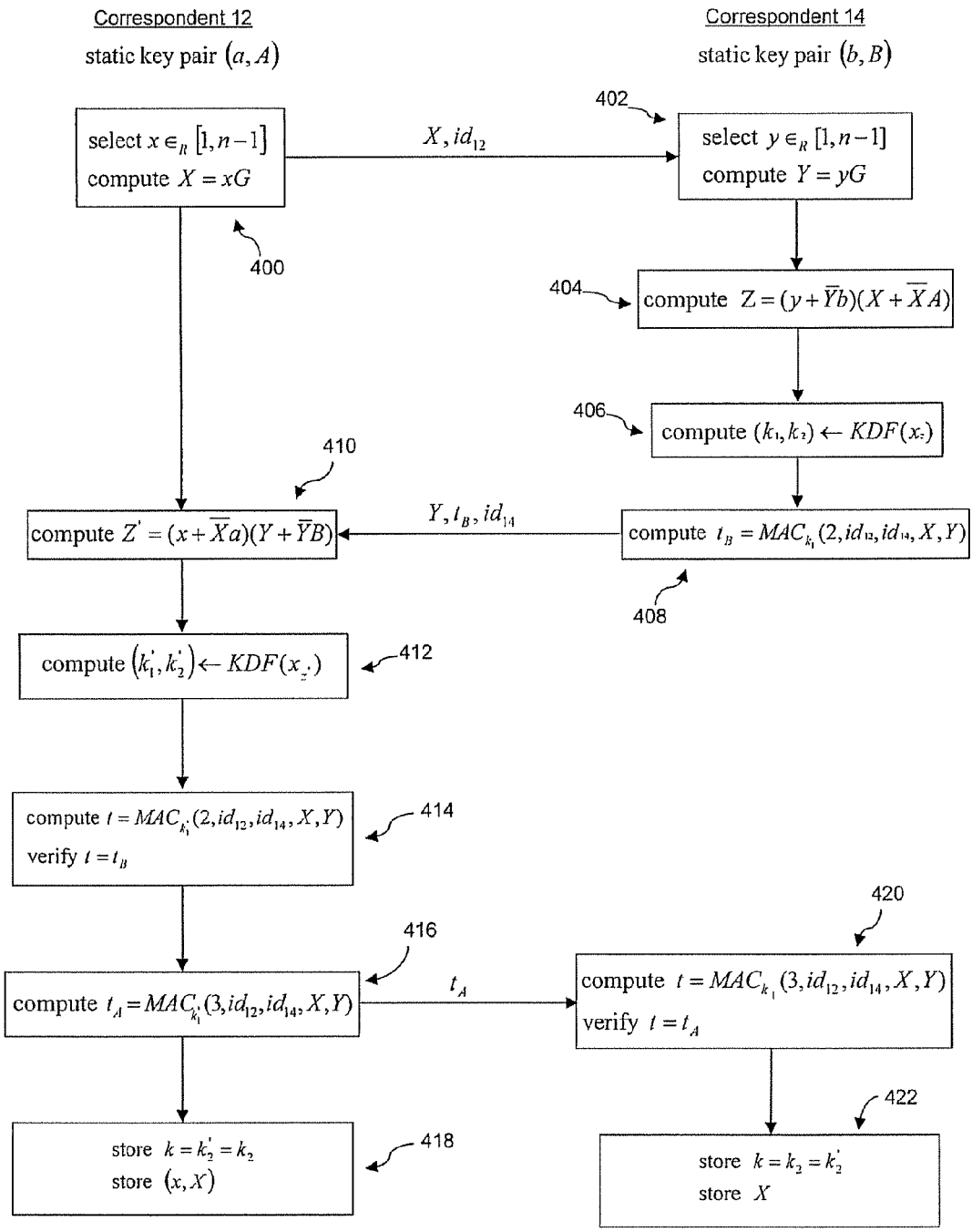
FIG. 6 is a schematic representation of ECMQV as modified for use in the embodiment shown in FIG. 5.

At the beginning of the session, correspondent 12 and correspondent 14 participate in an ECMQV key agreement 300. FIG. 6 outlines the ECMQV key agreement protocol in detail, in conjunction with the additional steps (418 and 422) of storing in memory ephemeral information generated during ECMQV. With reference to FIG. 6, the following steps are performed by correspondent 12 and correspondent 14 in the key agreement stage:

1. (Step 400) The cryptographic unit 18 of correspondent 12 randomly selects a private ephemeral key $x \in_R [1, n-1]$ and computes associated public ephemeral key $X = xG$, where G is a generator of the elliptic curve subgroup of order n. Ephemeral public key X, along with the identification tag of correspondent 12, $id_{12}$, is sent to correspondent 14.

2. (Step 402) The cryptographic unit 20 of correspondent 14 randomly selects private ephemeral key $y \in_R [i, n-1]$ and computes associated public ephemeral key $Y = yG$.

3. (Step 404) The cryptographic unit 20 of correspondent 14 computes shared secret $Z = (y + \overline{Y}b)(X + \overline{X}A)$. Note that for an elliptic curve point P, P represents the integer $(\overline{x}_p \mod 2^{\lceil f/2 \rceil}) + 2^{\lceil f/2 \rceil}$ where $\overline{x}_p$ is the integer representation of the first coordinate (also sometimes called the x-coordinate) of P, and $f = \lfloor \log_2 n \rfloor + 1$ is the bit length of n.

4. (Step 406) The cryptographic unit 20 of correspondent 14 computes $(k_1, k_2) \leftarrow KDF(x_z)$, where $x_z$ is the first coordinate of Z, and where $KDF(\bullet)$ is a Key Derivation Function, such as that described in Section 4.5.1 of "Guide to Elliptic Curve Cyrptography," Vanstone et al., Springer, 2004.

5. (Step 408) The cryptographic unit 20 of correspondent 14 computes $t_B = MAC_{k_1}(2, id_{12}, id_{14}, X, Y)$, where $MAC_{k_1}(\bullet)$ is a message authentication code algorithm, such as HMAC, that uses key $k_1$. Ephemeral public key Y, along with tag $t_B$ and the identification tag of correspondent 14, $id_{14}$, is then sent to correspondent 12.

6. (Step 410) The cryptographic unit 18 of correspondent 12 computes shared secret $Z' = (x + \overline{X}a)(Y + \overline{Y}B)$. It will be observed that $Z' = Z$ if (and only if) correspondent 12 and correspondent 14 correctly receive each other's public ephemeral keys.

7. (Step 412) The cryptographic unit 18 of correspondent 12 computes $(k'_1, k'_2) \leftarrow KDF(x_{Z'})$ where $x_{Z'}$ is the first coordinate of Z'.

8. (Step 414) The cryptographic unit 18 of correspondent 12 computes $t = MAC_{k'_1}(2, id_{12}, id_{14}, X, Y)$ and verifies that $t = t_B$.

9. (Step 416) The cryptographic unit 18 of correspondent 12 computes $t_A = MAC_{k'_1}(3, id_{12}, id_{14}, X, y)$ and sends $t_A$ to correspondent 14. It will be appreciated that the strings '2' and '3' in the MAC tag calculations are used in order to distinguish the authentication tags created by each correspondent.

10. (Step 418) Correspondent 12 stores the shared secret key $k = k'_2$ for use as the session key, as well as ephemeral private/public key pair (x, X) for subsequent use in the signing algorithm.

11. (Step 420) The cryptographic unit 20 of correspondent 14 computes $t = MAC_{k_1}(3, id_{12}, id_{14}, X, Y)$ and verifies that $t = t_A$.

12. (Step 422) Correspondent 14 stores the shared secret key $k = k_2$ for use as the session key, and optionally stores X for subsequent use in generating signature components not sent by correspondent 12.

During key agreement, correspondent 12 generates ephemeral private/public key pair (x, X), and correspondent 14 generates ephemeral private/public key pair (y, Y). Of these ephemeral keys, correspondent 12 retains (x, X) after key agreement to facilitate message signature. Correspondent 14 may retain X to enable a reduction in bandwidth whilst being able to verify the signature, as will be described below. Alternatively, correspondent 14 may delete X.

During the session, when a message m is to be signed, a modified ECDSA is used wherein the algorithm takes as additional inputs x and X and uses these in place of the ephemeral private and public keys conventionally generated during the ECDSA. As shown in step 302, signature component r is generated by cryptographic unit 18 as follows: $r = f(X) = \overline{x}_X \mod n$ where $\overline{x}_x$ is the integer representation of the first coordinate of the ephemeral public key X generated by correspondent 12 during key agreement. In step 304, the cryptographic unit 18 of correspondent 12 then computes second signature component $s = x^{-1}(H(m) + ar) \mod n$ where x is the ephemeral private key generated by correspondent 12 during key agreement. Whilst the message m and signature (r,s) may be sent to correspondent 14, to save bandwidth the message m, along with s only, is sent to correspondent 14. In step 306, the cryptographic unit 20 of correspondent 14 computes $r = f(X) = \overline{x}_X \mod n$ using the ephemeral public key X generated during key agreement. Signature components (r,s) have now been generated and are possessed by correspondent 14. Correspondent 14, or any third party that possesses m, A, and (r, s), can verify the signature using the standard verification protocol of the ECDSA.

In the above-described embodiment, there are computational savings over initiating an independent ECDSA signature. This results from correspondent 12 not having to generate a new ephemeral private/public key pair for each execution of ECDSA, but instead using the ephemeral private/public key pair (x, X) generated during key agreement. There are also bandwidth savings because correspondent 12 does not have to send signature component r to correspondent 14. This is because correspondent 14 will have received the public ephemeral key X of correspondent 12 during the key agreement exchange and can retain it in its memory 24. Of course, correspondent 12 may elect to send r to correspondent 14, thereby reducing the number of computations performed by correspondent 14, but eliminating the savings in bandwidth. In this case, correspondent 14 would not have to store X after key agreement.

In another implementation of the embodiment shown in FIG. 4, the ephemeral public and private keys generated in a key agreement scheme are used indirectly in providing a public ephemeral key for use in a digital signature scheme. Specifically, the shared secret computed by correspondent 12 and correspondent 14 during key agreement is used as the public ephemeral key in the signature generation portion of the signature scheme. Considering an embodiment that uses ECDSA and ECMQV, this means that shared secret Z obtained in the ECMQV protocol, which is computed in part using the ephemeral private/public key pairs (x, X) and (y, Y), is used in place of the ephemeral public key conventionally generated during ECDSA. As will be apparent below, this results in computational savings over initiating an independent ECDSA signature and also saves in bandwidth because the component r of the signature (r, s) need not be transmitted across the channel.

Figure 7:
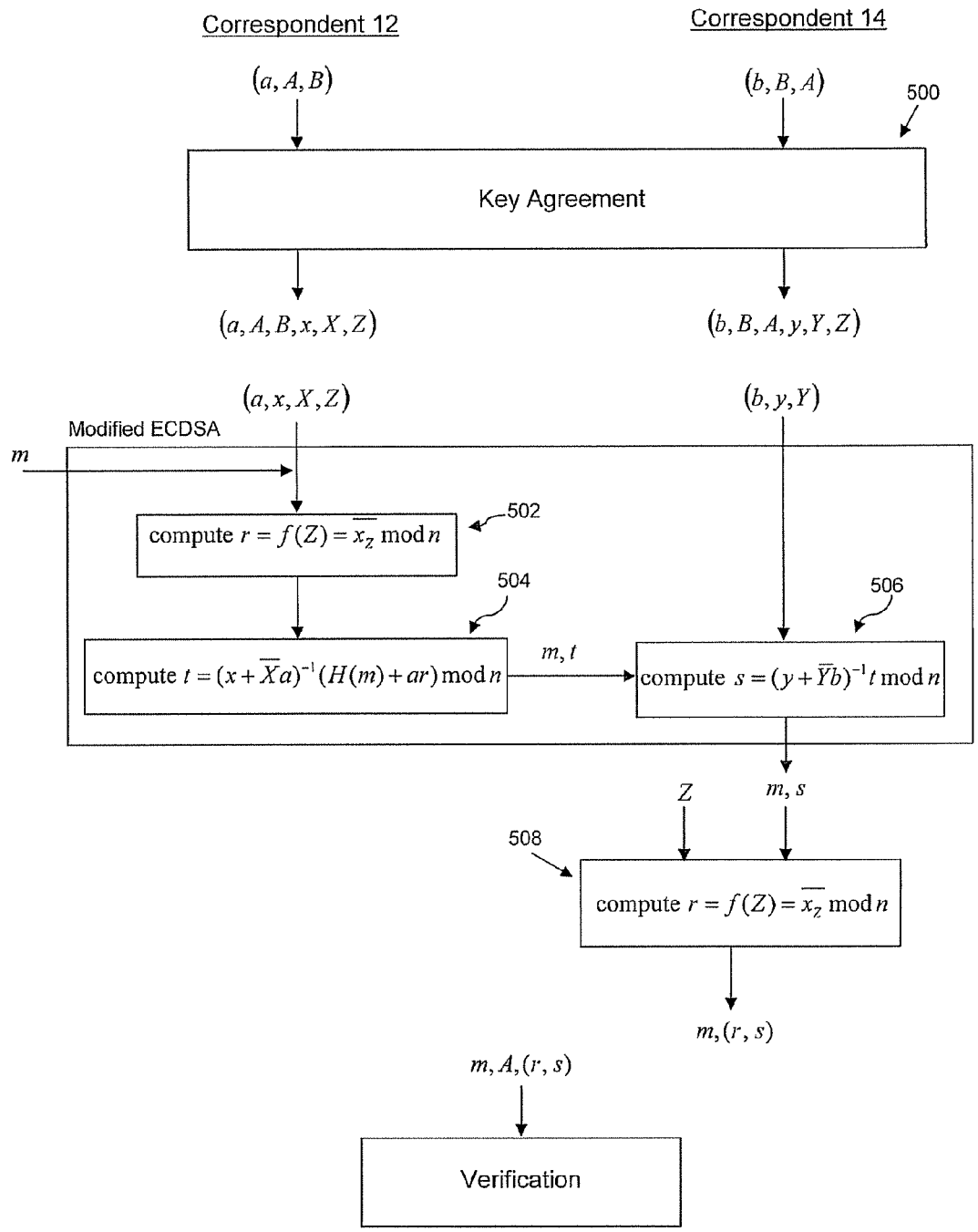
FIG. 7 is a schematic representation of another implementation of an embodiment of the improved digital signature scheme.

Turning therefore to FIG. 7, it will be assumed that correspondent 12 has static private/public key pair (a, A) and that correspondent 14 has static private/public key pair (b, B). Therefore, initially (prior to key agreement) correspondent 12 has stored in its memory 22 keys a, A, and B, whereas correspondent 14 has stored in its memory 24 keys b, B, and A.

As will be apparent below, in this embodiment correspondent 12 is unable to generate signature component s directly using the shared secret Z and therefore calculates an intermediate value t. The intermediate value t is sent to correspondent 14, which uses t and its own private information to calculate s. Therefore, in this embodiment both correspondents 12, 14 participate in the generation of the signature.

With reference to FIG. 7, at the beginning of the session, correspondent 12 and correspondent 14 participate in ECMQV key agreement 500. ECMQV has been described in detail in FIG. 6 with reference to the FIG. 5 embodiment. The only difference in key agreement in the FIG. 7 embodiment is that during step 418 correspondent 12 stores x, X and Z, and in step 422 correspondent 14 stores y, Y, and Z.

During the session, when a message m is to be signed, a modified ECDSA is used in which the algorithm takes as additional inputs x, X, y, Y, and Z, and uses Z in place of the ephemeral public key conventionally generated during each execution of the ECDSA. As shown in step 502, signature component r is calculated by the cryptographic unit 18 of correspondent 12 as follows: $r=f(Z)=\overline{x_Z}$ mod n, where $\overline{x_Z}$ is the integer representation of the first coordinate of shared secret $Z=(x+\overline{X} a)(Y+\overline{Y}B)$ computed during key agreement. In step 504, the cryptographic unit 18 of correspondent 12 then computes intermediate value $t=(x+\overline{X} a)^{-1}(H(m)+ar)$ mod n and sends t and m to correspondent 14. The cryptographic unit 20 of correspondent 14 computes signature component $s=(y+\overline{Y}b)^{-1}$ mod n at step 506 and (since r was not sent by correspondent 12) computes $r=f(Z)=\overline{x_Z}$ mod n where $\overline{x_Z}$ is the integer representation of the first coordinate of shared secret $Z=(y+\overline{Y}b)(X+\overline{X}A)$ computed during key agreement. Signature components (r, s) have now been generated and are possessed by correspondent 14. Correspondent 14 may now verify the signature using the standard verification protocol of the ECDSA, or may forward the parameters to any third party to perform verification.

It will be observed that in the embodiment described with reference to FIG. 7, correspondent 12 cannot obtain the private ephemeral key z corresponding to public ephemeral key Z, and therefore cannot compute the signature component s. Since Z is used as the public ephemeral key in the ECDSA, therefore the corresponding private ephemeral key is $z=(x+\overline{X} a)(y+\overline{Y}b)$ mod n. This being the case, correspondent 12 can never know z since it does not posses y and b, and therefore cannot compute $(y+\overline{Y}b)$. Therefore, at step 504 correspondent 12 does not compute s directly, but instead computes intermediate value t, which is used by correspondent 14 at step 506 to compute s. Despite the involvement of correspondent 14 in generating the signature (r, s), the signature still binds the message m only to correspondent 12. This is because the private key a of correspondent 12 was used in generating (r, s).

In the above-described embodiment, there are computational savings over initiating an independent ECDSA signature because correspondent 12 does not have to compute an ephemeral private/public key pair each time a message is to be signed. Instead Z is used as the ephemeral public key. As in the embodiment described with reference to FIG. 5, there may also be bandwidth savings because correspondent 12 does not have to send r to correspondent 14. The embodiment of FIG. 7 also has the advantage that the signature component s depends on contributions from both correspondent 12 and correspondent 14. Therefore, correspondent 14 can ensure correspondent 12 is actively participating in the generation of the signature. However, unlike the FIG. 5 embodiment, in the FIG. 7 embodiment correspondent 12 cannot use the same signature with multiple correspondents because the recipient (correspondent 14) participates in signature generation, unless of course correspondent 14 distributes the signature to the other correspondents. Also, in the FIG. 7 embodiment, the signature component r is directly derived from the shared secret Z established during key agreement, which may be undesirable in certain situations.

The embodiments shown in FIGS. 5 to 7 involve a two-pass key agreement scheme. It will be appreciated that the above-described improved digital signature scheme can equally be implemented subsequent to a one-pass key agreement scheme. As an example, consider an alternative embodiment in which the key agreement scheme shown in FIG. 5 is a one-pass key agreement scheme, for example the half-certified Diffie-Hellman protocol described on pg. 517 of the "Handbook of Applied Cryptography," Menezes et al., CRC Press, 1997, incorporated herein by reference. In the one-pass key agreement scheme, the initiator, correspondent 12, still generates ephemeral key pair (x, X), and therefore correspondent 12 can subsequently use ephemeral key pair (x, X) as the ephemeral key pair in a subsequent digital signature scheme.

Figure 8:
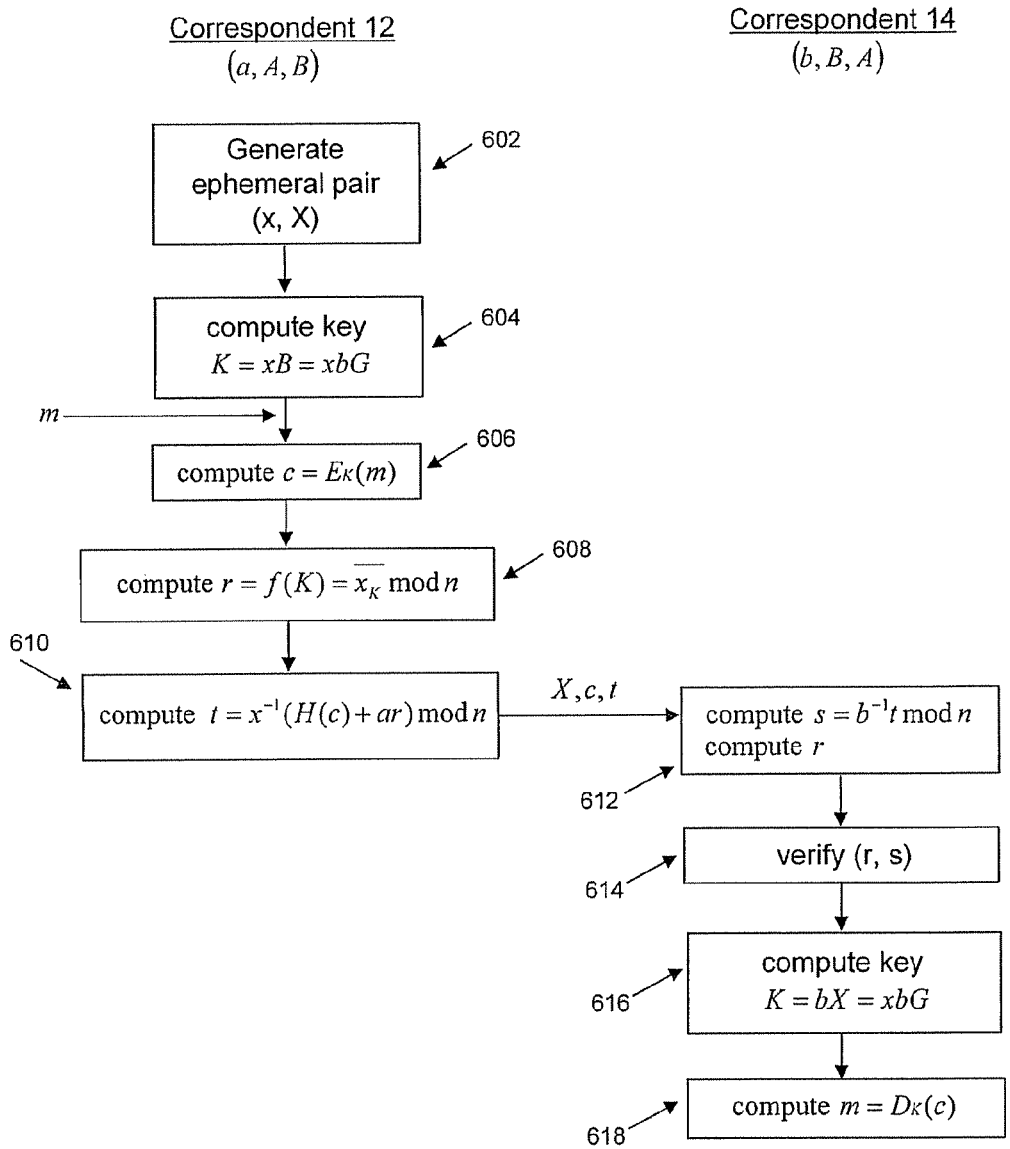
FIG. 8 is a schematic representation of yet another implementation of the improved digital signature scheme.

FIG. 8 shows an embodiment in which a shared key K and ephemeral key pair (x, X) obtained in a one-pass half-certified Diffie-Hellman protocol is subsequently used to improve the performance of a digital signature scheme. In the embodiment shown in FIG. 8, the shared secret computed by correspondent 12 and correspondent 14 during key agreement is used as the public ephemeral key in the signature generation portion of the signature scheme. This is similar to the embodiment shown in FIG. 7.

Turning therefore to FIG. 8, it will be assumed that correspondent 12 has static private/public key pair (a, A) and that correspondent 14 has static private/public key pair (b, B). Therefore, initially (prior to key agreement) correspondent 12 has stored in its memory 22 keys a, A, and B, whereas correspondent 14 has stored in its memory 24 keys b, B, and A.

As will be apparent below, in this embodiment correspondent 12 is unable to generate signature component s directly using the shared secret K and therefore calculates an intermediate value t. The intermediate value t is sent to correspondent 14, which uses t and its own private information to calculate s. Therefore, in this embodiment both correspondents 12, 14 participate in the generation of the signature.

With reference to FIG. 8, first in step 602, correspondent 12 generates an ephemeral key pair (x, X). Next, in step 604, the shared key K is computed by correspondent 12 as K=xB, which is also equal to K=xbG. Then, in step 606, the shared key K is used to encrypt a message m to obtain an encrypted message $c=E_K(m)$.

In step 608, the signature component r is calculated by correspondent 12 as $r=f(K)=\overline{x_K} \mod n$, where $\overline{x_K}$ is the integer representation of the first coordinate of shared key K.

Next, in step 610, correspondent 12 then computes intermediate value $t=x^{-1}(H(c)+ar) \mod n$ and sends t, c, and X to correspondent 14.

In step 612, correspondent 14 computes signature component $s=b^{-1}t \mod n$, and (since r was not sent by correspondent 12) computes $r=f(K)=\overline{x_K} \mod n$.

Then, in step 614, the signature (r, s) is verified, and if verification is successful, in step 616 correspondent 14 computes shared key K=bX, which is also equal to K=xbG.

Finally, in step 618, the message m is decrypted as $m=D_K(C)$.

In the above-described embodiment, there are computational savings over initiating an independent signature scheme because correspondent 12 does not have to compute an ephemeral private/public key pair to sign message c. There may also be bandwidth savings because correspondent 12 does not have to send r to correspondent 14. The embodiment of FIG. 8 also has the advantage that the signature component s depends on contributions from both correspondent 12 and correspondent 14. Therefore, correspondent 14 can ensure correspondent 12 is actively participating in the generation of the signature.

It will be observed that in the embodiment described in FIG. 8, the key agreement and signature schemes are linked in the sense that the message signed in the signature scheme has been encrypted using the shared key K. In a variation of the embodiment shown in FIG. 8, the shared key K is instead used by correspondent 12 to encrypt the signed message (m, r, s), and therefore correspondent 14 first calculates shared key K to decrypt the signed message before verifying the signature. It will also be appreciated that encryption of the message (or the signed message) is not required, but only desirable.

In applications in which at least one of the correspondents, say correspondent 12, performs a digital signature scheme prior to a key agreement scheme, it is contemplated that the ephemeral private and public keys generated by correspondent 12 during the digital signature scheme can be stored and used as the ephemeral private and public keys of correspondent 12 in a subsequent key agreement scheme. Once such embodiment is shown with reference to FIG. 9.

It will be assumed that correspondent 12 has static private/public key pair (a, A) and that correspondent 14 has static private/public key pair (b, B). Therefore, initially correspondent 12 has stored in its memory 22 keys a, A, and B, whereas correspondent 14 has stored in its memory 24 keys b, B, and A.

Prior to key agreement, in step 702, correspondent 12 signs a message using the ECDSA. However, advantageously, the ephemeral private and public key pair (x, X) generated during ECDSA is retained by correspondent 12 and stored in its memory 22.

Subsequently, correspondent 12 and correspondent 14 wish to participate in a key agreement scheme to establish a shared key k. Therefore, in the embodiment shown in FIG. 9, a modified ECMQV key agreement protocol is used in which the key agreement protocol takes as additional inputs x and X and uses these in place of the ephemeral private and public keys conventionally generated by correspondent 12 during the ECMQV scheme. Specifically, as shown in step 704, in lieu of step 400 in FIG. 6, correspondent 12 instead retrieves private/public key pair (x, X) from its memory 22. In step 706, correspondent 14 performs step 402 of FIG. 6. Steps 404 to 416 and step 420 of FIG. 6 are then performed to obtain a shared key k.

Figure 9:
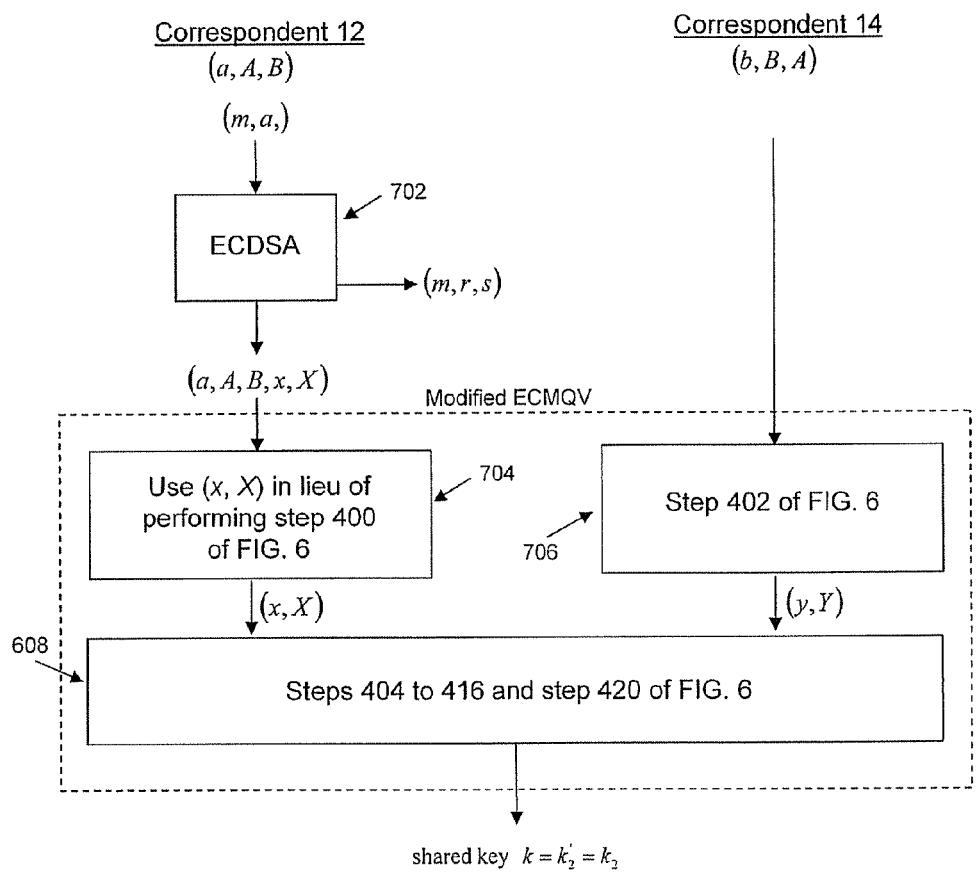
FIG. 9 is a schematic representation of an embodiment of an improved key agreement scheme.

Advantageously, in the embodiment described in FIG. 9, there are computational savings over initiating an independent ECMQV protocol. This results from correspondent 12 not having to generate a new ephemeral private/public key pair to participate in ECMQV key agreement, but instead using the ephemeral private/public key pair (x, X) generated during the signature scheme.

In the embodiment described in FIG. 9, it will be appreciated that if the correspondent 14 also performs a digital signature scheme prior to key agreement, then the correspondent 14 can also store and re-use its ephemeral key pair (y, Y) generated during the digital signature scheme in lieu of performing step 402 of FIG. 6, thereby providing even further computational savings.

Diffie-Hellman key agreement with signed key contributions is one example of an application in which one or each of the correspondents performs a signature scheme prior to key agreement, and therefore an example of an application in which the technique described with reference to FIG. 9 can offer computational savings.

The technique described with reference to FIG. 9 can also be extended to conference keying schemes, such as the Burmester-Desmedt conference keying scheme described on pages 528-529 of the "Handbook of Applied Cryptography," Menezes et al., CRC Press, 1997, and incorporated herein by reference. In conference keying schemes such as the Burmester-Desmedt conference keying scheme, it is necessary for each correspondent participating in the scheme to generate an ephemeral private/public key pair for use in constructing a shared key k. It is contemplated that instead of generating an ephemeral private/public key pair, each participating correspondent instead retrieves from its memory an ephemeral private/public key pair generated during a previous signature scheme. This reduces the computational requirements necessary to perform the conference keying scheme since the participating correspondents do not have to generate a new ephemeral private/public key pair.

Although the above techniques have been described with reference to certain specific embodiments, various modifications thereof will be apparent to those skilled in the art without departing from the spirit and scope of the claims appended hereto.

For example, the above described embodiments provide examples of how ephemeral parameters generated in one of a key agreement scheme and a digital signature scheme can be used to reduce the number of computations in the other scheme. It will be appreciated that the above are only exemplary embodiments, and that alternatives are within the spirit and scope of the invention. For example, the disclosed techniques are not limited to ECDSA and ECMQV, but may be applied to any system in which ephemeral private and public keys are used in key agreement and in digital signature schemes. Examples of alternative key agreement schemes include, but are not limited to, Diffie-Hellman, ECDH, MQV, and MTI. Examples of alternative digital signature schemes include, but are not limited to, DSA, Pintsov-Vanstone, ECPVS, ECNR, Schnorr scheme, and DSS.

More generally, it will be appreciated that any embodiment in which shared or public information generated during one of the key agreement scheme and the digital signature scheme is utilized in the other scheme is within the scope of what has been contemplated.

What is claimed is:

1. A method for secure communications, the method comprising:
    a cryptographic unit of a first correspondent performing a key agreement protocol using information derived from a private key of a second correspondent in a communication system to establish a shared key with said second correspondent, said first correspondent generating an ephemeral private key x, and an ephemeral public key X corresponding to said ephemeral private key x during said key agreement protocol;
    said cryptographic unit of said first correspondent generating a digital signature for a message in the data communication system, said generation of said digital signature comprising:
    said cryptographic unit using said ephemeral public key X of said first correspondent to generate a first signature component; and
    said cryptographic unit using said message, and said first signature component to generate a second signature component;
    said first correspondent forwarding said second signature component to said second correspondent.

2. The method of claim 1 wherein cryptographic operations in said communication system are based on an elliptic curve group of order n, said first signature component is of the form $r=\overline{x}_X$ mod n, and said second signature component is of the form $s=x^{-1}(H(m)+ar)$ mod n; wherein $\overline{x}_X$ is an integer representation of a first coordinate of said i ephemeral public key X of said first correspondent, a is a static private key of said first correspondent, and H(m) is a hash of said message m.

3. The method of claim 2 wherein said first signature component r is not transmitted to said second correspondent, said first signature component being computable by said second correspondent using said ephemeral public key X of said first correspondent by computing $r=\overline{x}_X$ mod n.

4. The method of claim 2 wherein said key agreement protocol is an Elliptic Curve Menezes Qu Vanstone (ECMQV) key agreement protocol.

5. The method of claim 1 wherein said shared key K is used to encrypt a data string to generate said message, and said message is forwarded with said first signature component and said second signature component.

6. The method of claim 1 wherein said cryptographic unit uses said information derived from a private key of a second correspondent to generate said first signature component.

7. The method of claim 6 wherein a shared value is generated in establishing said shared key and said shared value is used to obtain said first signature component.

8. The method of claim 7 wherein cryptographic operations in said communication system are based on an elliptic curve group of order n, said key agreement is ECMQV key agreement, said first signature component is of the form $r=\overline{x}_Z$ mod n, and said second signature component is an intermediate value of the form $t=(x+\overline{X}a)^{-1}(H(m)+ar)$ mod n; wherein $\overline{x}_Z$ is an integer representation of a first coordinate of said shared value Z, x is said i ephemeral private key of said first correspondent, $\overline{X}$ is an integer derived using said ephemeral public key X corresponding to said ephemeral private key x, a is a static private key of said first correspondent, and H(m) is a hash of said message.

9. The method of claim 7 wherein said first signature component r is not transmitted to said second correspondent, said first signature component being computable by said second correspondent using said shared value Z by computing $r=\overline{x}_Z$ mod n.

10. The method of claim 7 wherein said shared value is said shared key.

11. The method of claim 10 wherein said communication system is based on an elliptic curve group of order n, said first signature component is of the form $r=\overline{x}_K$ mod n, and said second signature component is an intermediate value of the form $t=x^{-1}(H(m)+ar)$ mod n; wherein $\overline{x}_K$ is an integer representation of a first coordinate of said shared key K, a is a static private key of said first correspondent, and H(m) is a hash of said message.

12. The method of claim 11 wherein said first signature component r is not transmitted to said second correspondent, said first signature component being computable by said second correspondent using said shared key K by computing $r=\overline{x}_K$ mod n.

13. The method of claim 10 wherein said key agreement protocol is a one pass key agreement protocol.

14. The method of claim 7 wherein said shared value is used as an input to a key derivation function to obtain said shared key.

15. The method of claim 7 wherein said shared value combines private static information and private ephemeral information of said first correspondent with public static information and public ephemeral information of the said second correspondent.

16. The method of claim 15 wherein cryptographic operations in said communication system are based on an elliptic curve group of order n and said shared value has the form $Z=(x+\overline{X}a)(Y+\overline{Y}B)$; where x is said ephemeral private key, $\overline{X}$ is an integer representation of a first coordinate of said ephemeral public key X, a is a static private key of said first correspondent, Y is an ephemeral public key of said second correspondent, $\overline{Y}$ is an integer representation of a first coordinate of said ephemeral public key Y, and B is a static public key of said second correspondent.

17. The method of claim 16 wherein said shared value Z is used as an input to a key derivation function to obtain said shared key.

18. A device for secure communication in a communication system, the device comprising:
    a cryptographic unit having a processor coupled to a memory, the memory comprising executable instructions for configuring said processor to:
    perform a key agreement protocol using information derived from a private key of a second correspondent in said communication system to establish a shared key with said second correspondent, and, during said key agreement protocol, generate an ephemeral private key x, and an ephemeral public key X corresponding to said ephemeral private key x;

generate a digital signature for a message in the data communication system, said generation of said digital signature comprising:
using said ephemeral public key X to generate a first signature component;
generating a second signature component using said message, and said first signature component.

19. A non-transitory computer readable storage medium for secure communication in a communication system, the computer readable storage medium comprising executable instructions for:
performing a key agreement protocol using information derived from a private key of a second correspondent in a communication system to establish a shared key with said second correspondent, and during said key agreement generating an ephemeral private key x, and an ephemeral public key X corresponding to said ephemeral private key x;
generating a digital signature for a message in the data communication system, said generation of said digital signature comprising:
using said ephemeral public key X to generate a first signature component; and
using said message, and said first signature component to generate a second signature component.

20. A method for secure communications, the method comprising:—
a cryptographic unit of a second correspondent performing a key agreement protocol using an ephemeral public key obtained from a first correspondent to establish a shared key between the correspondents in a communication system,
said cryptographic unit of said second correspondent verifying a digital signature for a message from said first correspondent, said verification of said digital signature comprising:—
said cryptographic unit of said second correspondent obtaining a first signature component, said first signature component incorporating said ephemeral public key of said first correspondent,
said cryptographic unit obtaining a further signature component and using said further signature component and said first signature component to verify said signature.

21. The method of claim 20 wherein said further signature component is obtained from a second signature component and a private key of said second correspondent.

22. The method of claim 21 wherein said further signature component is obtained from said second signature component, an ephemeral private key of said second correspondent, an ephemeral public key derived from said ephemeral private key of said second correspondent, and a static private key of said second correspondent.

23. The method of claim 22 wherein cryptographic operations in said communication system are based on an elliptic curve group and said further signature component s is obtained from $s=(y+\overline{Y}b)^{-1}t \bmod n$; where y is said ephemeral private key, $\overline{Y}$ is an integer derived from the x coordinate of the ephemeral public key, b is the static private key of said second correspondent, t is the second signature component, and n is the order of the elliptic curve group.

24. The method of claim 23 wherein said second signature component t is of the form $t=(x+\overline{X}a)^{-1}(H(m)+ar) \bmod n$; where x is an ephemeral private key of said first correspondent, $\overline{X}$ is an integer representation of a first coordinate of said ephemeral public key of said first correspondent, H(m) is a hash of a message m, a is a private static key of said first correspondent, and r is said first signature component.

25. The method of claim 20 wherein said second correspondent computes a shared value using said ephemeral public key of said first correspondent and said first signature component is obtained from said shared value.

26. The method of claim 25 wherein said shared value is obtained by said second correspondent combining private information of said second correspondent with public information of said first correspondent.

27. The method of claim 26 wherein cryptographic operations in said communication system are based on an elliptic curve group of order n, said shared value has the form $Z=(y+\overline{Y}b)(X+\overline{X}A)$; where y is an ephemeral private key of said second correspondent, b is the static private key of the second correspondent, $\overline{Y}$ is an integer representation of a coordinate of the ephemeral public key of the second correspondent, X is the ephemeral public key of the first correspondent, $\overline{X}$ is an integer representation of the coordinate of the ephemeral public key of the first correspondent, and A is the static public key of the first correspondent.

28. The method of claim 25 wherein said shared value is said shared key.

29. The method of claim 20 wherein said second correspondent applies said shared key to the message to decrypt the message.

30. A device for secure communication between correspondents in a communication system, the device comprising;
a cryptographic unit having a processor coupled to a memory, the memory comprising executable instructions for configuring said processor to:
obtain an ephemeral public key of a first correspondent,
perform a key agreement protocol using said ephemeral public key to establish a shared key between said correspondents,
verify a digital signature for a message from said first correspondent, said verification of said digital signature comprising:
obtaining a first signature component, said first signature component incorporating said ephemeral public key of said first correspondent,
obtaining a further signature component and using said further signature component and said first signature component to verify said signature.

31. A non-transitory computer readable storage medium for secure communication in a communication system, the computer readable storage medium comprising executable instructions for:
performing a key agreement protocol using an ephemeral public key obtained from a first correspondent to establish a shared key between the correspondents in the communication system,
verifying a digital signature for a message from said first correspondent, said verification of said digital signature comprising:
obtaining a first signature component, said first signature component incorporating said ephemeral public key of said first correspondent,
obtaining a further signature component and using said further signature component and said first signature component to verify said signature.

* * * * *